United States Patent [19]

Atchley

[11] Patent Number: 4,762,086

[45] Date of Patent: Aug. 9, 1988

[54] WATER FOUNT FOR ANIMAL CAGES

[76] Inventor: Frank W. Atchley, 461 Walnut St., Napa, Calif. 94559

[21] Appl. No.: 847,588

[22] Filed: Mar. 31, 1986

[51] Int. Cl.⁴ .............................................. A01K 7/00
[52] U.S. Cl. ......................................... 119/18; 119/77
[58] Field of Search ........................... 119/18, 51.5, 77

[56] References Cited

U.S. PATENT DOCUMENTS

| | | | |
|---|---|---|---|
| 847,014 | 3/1907 | Lee | 119/77 |
| 1,239,151 | 9/1917 | Woods | 119/18 |
| 1,450,494 | 4/1923 | Eummelen | 119/18 |
| 1,755,706 | 4/1930 | George | 119/18 |
| 2,931,334 | 4/1960 | Hammond | 119/18 |
| 3,417,735 | 12/1968 | Drake | 119/18 |
| 3,529,575 | 9/1970 | Schalk | 119/18 |
| 4,134,365 | 1/1979 | Futers et al. | 119/51.5 |

FOREIGN PATENT DOCUMENTS 43731 6/1908 Switzerland .......................... 119/77

Primary Examiner—Carl D. Friedman
Assistant Examiner—Caroline D. Dennison
Attorney, Agent, or Firm—Harris Zimmerman; Howard Cohen

[57] ABSTRACT

A water dispenser for a small animal cage has a fount member that extends horizontally into the cage from the mouth of an inverted bottle and which forms an open reservoir into which water flows from the bottle to replace water consumed by the animal. A tapered vertical passage in the member frictionally grips the mouth of the bottle. A horizontal wire of the cage wall is received in one of a series of transverse grooves situated along the underside of the fount member and the bottle is held against the cage wall by a length of flexible coil spring or the like. The construction enables use of ordinary beverage bottles that are available to most persons at little or no cost. The water dispenser is inexpensive and packaging, shipping and distribution is simplified as it is not necessary to supply a bulky specialized water container along with the other components.

4 Claims, 1 Drawing Sheet

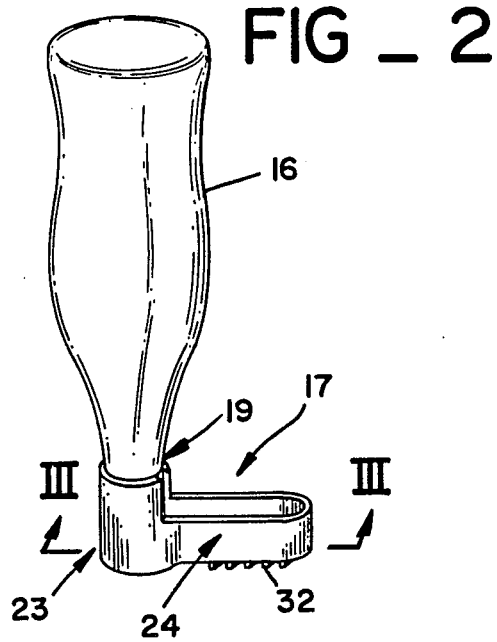
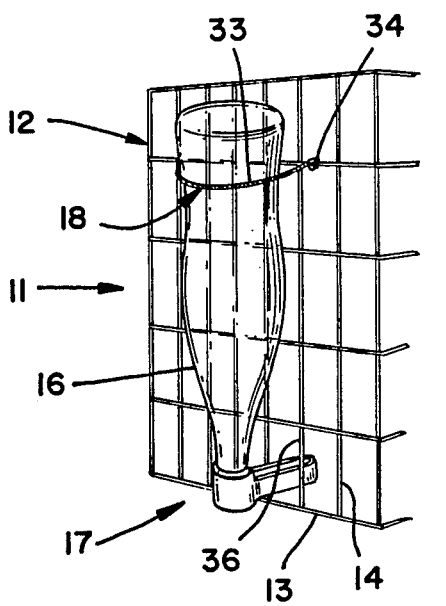
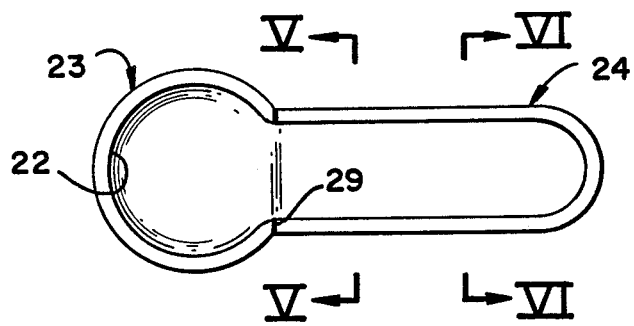
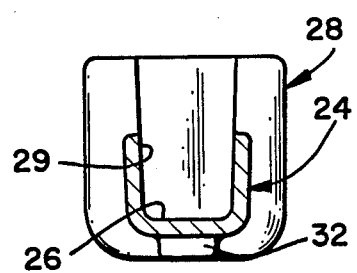
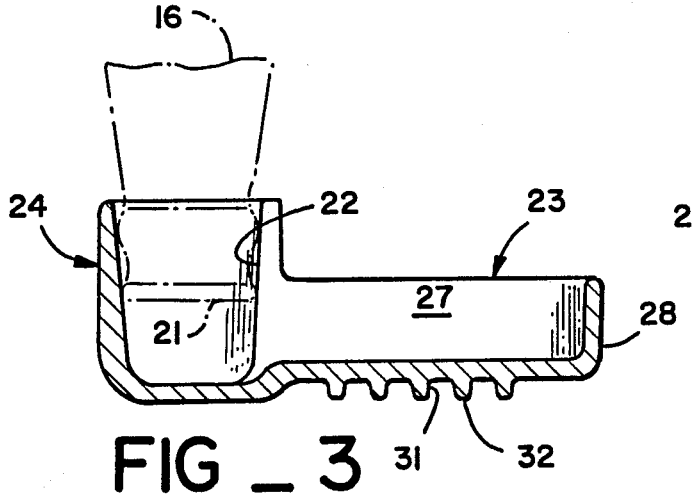
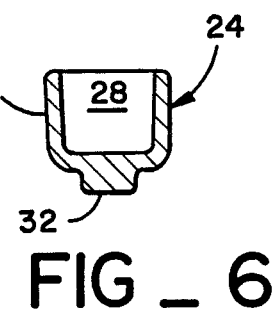

WATER FOUNT FOR ANIMAL CAGES

TECHNICAL FIELD

This invention relates to animal watering devices and more particularly to water dispensers of the type designed for mounting on the wall of a cage or the like in which birds, rodents or other small animals are confined.

BACKGROUND OF THE INVENTION

An ordinary water dish is not particularly suitable for use in small animal cages. Such a dish does not have sufficient water holding capacity unless it is of undesirably large size and many animals can easily tip over an ordinary dish. Consequently, a variety of dispensers have heretofore been designed which transmit water from an external container through a wall opening of the cage at a rate matching the animal's consumption of water.

Such dispensers or water founts are typically attached to a wire mesh wall of the cage and include a water supply container with an opening at the lower end and a flow transmitting member which extends from the opening at the bottom of the container into the cage through the mesh wall. A small initial outflow of water creates a vacuum at the top of the container that prevents further flow except for such flow as is needed to replace water withdrawn from the flow transmitting member by the animal.

Water founts of the above described type as heretofore marketed include the flow transmitting member, structure for attaching the fount to the wall of a cage and a specialized water supply container specifically designed to interconnect with the flow transmitting member and attachment means. Diameters at the lower end of the container and at the portion of the flow transmitting member which engages with the container must match and the configuration of the container is designed to accomodate to that of the clamps, brackets or the like which secure the fount to the cage.

The specialized water container is typically the most bulky component of the assembly and adds substantially to the cost of the water fount. In addition to the cost of the specialized container itself, packaging and shipping costs for the assembly as a whole are increased by the bulk of the container. Many such water containers are prone to breakage and replacement of a broken container results in still additional expense.

Thus a water fount that does not require a specialized water supply container would be highly advantageous. Components for such water founts could be marketed more economically and in a substantially more compact form.

The present invention is directed to overcoming one or more of the problems discussed above.

SUMMARY OF THE INVENTION

In one aspect, the present invention provides a fount member for transmitting water or other flowable substance from the mouth of an inverted bottle into an adjacent animal cage, the fount member having a bottle engaging portion with a downwardly extending passage proportioned to receive the mouth of the inverted bottle, at least a portion of the passage being of progressively diminishing diameter in the downward direction. The fount member further includes a trough portion which extends sidewardly from the bottle engaging portion to form a horizontally extending open fluid reservoir that communicates with the passage of the bottle engaging portion and has means for engaging an element of the cage to inhibit outward movement of the fount member from the cage.

In another aspect, the invention provides a fount member for supporting an inverted bottle adjacent an animal cage and for transmitting fluid contents of the bottle into the cage through an opening in the cage wall, the fount member having a bottle engaging portion at which a circular passage extends down into the member which passage is of progressively decreasing diameter in the downward direction. The fount member also has a trough portion which extends horizontally from the bottle engaging portion and which forms an open fluid reservoir that is communicated with the passage of the bottle engaging portion. The fount member further includes a plurality of spaced apart downwardly extending teeth along the underside of the trough portion.

In still another aspect, the invention provides a water fount at a wall of an animal cage which wall is a wire mesh having horizontal and vertical wires. The water fount includes an inverted bottle situated adjacent the cage wall and which has a circular mouth at the lower end and further includes a fount member having a bottle engaging region with a tapered vertical passage into which the bottle mouth extends for a distance that is less than the full depth of the passage. The fount member has a trough portion which extends sidewardly from the bottle engaging region through the wire mesh and which forms an open horizontally extending reservoir that is communicated with the passage below the level of the bottle mouth. The fount member also has a plurality of downwardly extending teeth spaced apart along the underside of the trough portion, an adjacent pair of the teeth being disposed at opposite sides of one of the horizontal wires of the wire mesh. The water fount further includes a length of flexible resilient material extending around a portion of the bottle above the fount member and having opposite ends attached to the cage wall at opposite sides of the bottle.

The fount member of the invention is adapted to engage with the mouth of any of a variety of common bottles that are readily available to most persons at little or no cost. These include, for example, the bottles in which beverages such as soft drinks or beer are distributed. Thus persons requiring a water fount for an animal cage need not purchase a bulky and costly specialized water container along with the other components of the fount. Packaging, shipping and distribution of water founts are simplified by the absence of a bulky water container. Replacement of a broken container, if it becomes necessary, can be quickly effected at little or no cost.

BRIEF DESCRIPTION OF THE DRAWINGS

FIG. 1 is a perspective view of a water fount in accordance with one embodiment of the invention shown installed on an animal cage wall.

FIG. 2 is a perspective view of certain components of the water fount of FIG. 1 shown apart from the animal cage.

FIG. 3 is an elevation section view of the water fount components of FIG. 2 taken along line III—III thereof.

FIG. 4 is a plan view of a fount member component of the water fount of the preceding figures.

FIG. 5 is a cross section view of the fount member of FIG. 4 taken along line IV—IV thereof.

FIG. 6 is another cross section view of the fount member of FIG. 4 taken along line VI—VI thereof.

DETAILED DESCRIPTION OF THE PREFERRED EMBODIMENT

Referring initially to FIG. 1 of the drawings, a water fount 11 in accordance with this embodiment of the invention is designed for attachment to an animal cage wall 12 which is typically a wire mesh having horizontal and vertical wires 13 and 14 respectively. Components of the water fount 11 include an inverted bottle 16 for containing a supply of water or other liquid that is to be dispensed to an animal or animals confined by the cage wall 12, a fount member 17 which extends through the cage wall from the mouth of the bottle and means 18 for holding the bottle against the cage wall.

The bottle 16 need not be specifically designed for use in the water fount 11 but is instead a beverage bottle of the type in which soft drinks, beer or the like are distributed to consumers and which are normally discarded or returned to the distributor where deposits are required. Referring now to FIGS. 2 and 3 in conjunction, such bottles 16 typically have a narrow neck 19 terminating at a circular mouth 21. During assembly of the water fount 11, the mouth 21 of bottle 16 is inserted into a downwardly extending passage 22 in a bottle engaging portion 23 of the fount member 17.

Referring to FIGS. 3 and 4 in conjunction, the bottle engaging portion 23 of fount member 17 is of essentially cylindrical configuration and has an outside diameter somewhat greater than the outside diameter of the bottle mouth 21. Passage 22, which is closed at the bottom, is tapered to be of progressively diminishing diameter in the downward direction. The upper end of passage 22 is of slightly greater diameter than the mouths 21 of typical beverage bottles 16 while the lower end of the passage is of slightly less diameter than such bottle mouths. Thus the bottle mouth 21 can be wedged into passage 22 to effect a frictional fitting of the fount member 17 on the bottle with the mouth of the bottle being at a level spaced above the bottom of passage 22.

A trough portion 24 of the fount member 17 extends sidewardly from the bottle engaging portion 23 and is of essentially U-shaped cross section, as best seen in FIGS. 5 and 6, in order to form an open horizontally extending liquid reservoir 26. The sidewalls 27 and the end wall 28 of trough portion 24 do not extend as far upward as the bottle engaging portion 23 of member 17 but extend somewhat higher than the level of the mouth 21 of the bottle 16 within passage 22.

Referring now to FIGS. 4 and 5, the bottle engaging portion 23 of fount member 17 has a broad vertical slot 29 which communicates the reservoir 26 with the lower portion of passage 22 to enable fluid flow from the bottle 16 into the reservoir. Slot 29 preferably extends to the top of the bottle engaging portion 23 of member 17. This provides for some resilient expansion of the fount member 17 as bottle mouth 21 is forced into passage 22 and thereby enhances frictional gripping of the bottle mouth by the member.

Referring now to FIGS. 3 and 5 in conjunction, sideward ejection of the fount member 17 from an animal cage is prevented by a series of spaced apart transverse grooves 31, defined by a series of spaced apart transverse teeth 32, situated along the underside of the trough portion 24 of the member. Teeth 32 are spaced apart a distance sufficient to enable a horizontal wire of an animal cage to be entered into a selected one of the grooves 31 as will hereinafter be described in more detail.

The fount member 17 may be formed of any of a variety of materials but preferably is metal, such as aluminum for example, that resists damage from gnawing or other activities of an animal.

Referring again to FIG. 1, it is preferable that the means 18 for holding the bottle 16 against cage wall 12 be capable of performing that function with bottles of any of various different diameters and configurations. Such means 18 in this example is a flexible coil spring 33 of sufficient length to reach around bottles 16 and having a hook 34 at each end which can be engaged with a cage wire 13 or 14 at each side of the bottle although a length of other flexible and preferably resilient material may also be used.

In operation, bottle 16 is filled with water or other liquid which is to be dispensed to a caged animal and fount member 17 is then fitted onto the bottle by forcing the bottle mouth 21 into passage 22 of the member until it is frictionally gripped by the tapered passage. The bottle 16 with the fount member 17 thereon is then quickly inverted. Water then flows from the bottle 16 to the extent needed to fill reservoir 26 up to the level of the bottle mouth 21. Significant further flow does not occur, until water is removed from the reservoir 26, as air can no longer enter the bottle 16 to maintain normal air pressure at the top of the bottle. Thus a low pressure condition develops at the top of the bottle 16 which low pressure holds the volume of water within the bottle. Removal of water from reservoir 26 by an animal lowers the water level in the reservoir enabling entry of air into the bottle 16 and outflow of water until the original water level is restored.

The water fount 11 is then installed on cage wall 12 by inserting the trough portion 24 of fount member 17 into the cage through an opening 36 between the wires 13, 14 of the wall. The horizontal wire 13 which defines the bottom of that opening 36 is received in one of the grooves 31 of the fount member 17, the particular groove which is selected for that purpose being dependent on the thickness of the particular bottle 16. The selected groove 31 is the one which can be engaged on wire 14 with the bottle 16 being vertical and disposed against the cage wall 14. Spring 33 is then stretched and extended around the bottle 16 above the fount member 17 and the hooks 34 are engaged on wires 13 or 14 of the cage wall 12 at each side of the bottle.

The water fount 11 may be temporarily disassembled for refilling of bottle 16 by reversing the above described steps.

Thus the invention provides for installation of a water fount 11 at an animal cage in a very convenient and economical manner by enabling use of a common beverage bottle 16 or the like for water storage. Such bottles 16 are not only readily available to most persons at little or no cost but are also, in general, relatively break proof and durable. Packaging, shipping and marketing of water founts is simplified as it is not necessary to include the bulky water 16 itself with the other components that are purchased by the consumer.

While the invention has been described with respect to a particular preferred embodiment, variations in the construction are possible and it is not intended to limit the invention except as defined in the following claims.

I claim:

1. A fount assembly for delivering water or other flowable substance to an animal cage having a wall with an opening therethrough, including; a fount member having a trough portion disposed to extend through said wall opening;

said fount member including means for engaging reservoir bottles having a wide range of heights, diameters, and mouth sizes and configurations, said means for engaging including a bottle engaging portion having an upwardly opening passage disposed exteriorly of the cage wall and adapted to receive the mouth of an inverted bottle, said passage having a progressively diminishing diameter in the downward direction to accommodate and frictionally retain bottle mouths of various diameters, said trough portion communicating with said upwardly opening passage;

said means for engaging further including more than two teeth extending downwardly from said trough portion and disposed to engage a lower edge of the opening in the cage wall, said teeth spaced longitudinally along said trough portion at successively greater distances from said bottle engaging portion to permit insertion of said trough portion into the cage wall opening to a selective extent to accommodate bottles of various diameters supported in said bottle engaging portion exteriorly of the cage wall; and a length of flexible resilient material adapted to extend around a portion of the bottle above said fount member and having opposite ends adopted to be attached to the exterior of the cage wall at opposite sides of the bottle to retain the upper portion of the inverted bottle to the cage wall.

2. The fount member of claim 1 wherein the top of said bottle engaging portion of said member extends above the top of said trough portion thereof.

3. The fount member of claim 2 wherein said bottle engaging portion of said member has a vertical slot which extends down 4. The water fount of claim 1 wherein said length of flexible resilient material is an extendable coil spring having a hook at each end thereof.

* * * * *